C. H. FLORIAN.
OBJECTIVE.
APPLICATION FILED JUNE 4, 1913.
1,168,873. Patented Jan. 18, 1916.
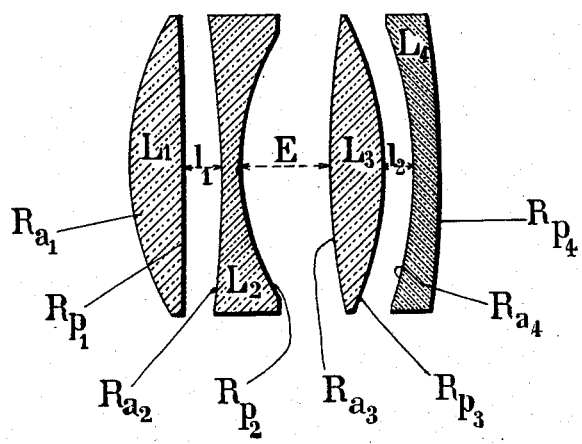

UNITED STATES PATENT OFFICE.

CHARLES HENRI FLORIAN, OF PARIS, FRANCE, ASSIGNOR TO SOCIÉTÉ ANONYME DES ETABLISSEMENTS LACOUR-BERTHIOT, OF PARIS, FRANCE.

OBJECTIVE.

1,168,873. Specification of Letters Patent. Patented Jan. 18, 1916.

Application filed June 4, 1913. Serial No. 771,690.

*To all whom it may concern:*

Be it known that I, CHARLES HENRI FLORIAN, of 9 Rue Froissart, in the city of Paris, Republic of France, have invented an Objective, of which the following is a full, clear, and exact description.

The invention relates to the production of an objective having a relatively large opening which is corrected in a manner as perfect as possible from chromatic, spherical, field curvature and astigmatic aberrations.

The objective is constituted by a triplet lens possessing strong aberration, but having a relatively large opening, which is combined with a divergent meniscus of such shape and position that it corrects the aberrations of the triplet without reducing the opening to any considerable extent.

The accompanying drawing, given by way of example only, illustrates diagrammatically the new objective.

The front lens $L_1$ of the triplet is biconvex or planoconvex and presents a high front curvature and a small back curvature. The second lens $L_2$ is biconcave. Between this lens and the preceding one is an air space. The third lens $L_3$ is biconvex and separated from the lens $L_2$ by a space E in which the diaphragm is placed. Behind these lenses is placed a divergent meniscus $L_4$.

Owing to the nature and disposition of its elements and on account of the choice of the lenses and their thicknesses, the triplet, constituted by the three lenses $L_1$, $L_2$, $L_3$, presents the following characteristic qualities: 1. Very slight chromatic aberration. 2. Considerable spherical aberration. 3. Positive field curvature. 4. High astigmatism. 5. Combined with the meniscus, it possesses: 1. The power of annulling the chromatism of the entire objective. 2. Curvatures doing away with spherical aberration. 3. A thickness which, for a distance equal to $L_3$ and given curvatures and power, annuls the field curvature. 4. Moreover, the distance from the meniscus to the lens $L_3$ is such that said meniscus corrects the astigmatism. Of course, the various aberrations are corrected jointly and it would not suffice, for instance, to give $L_4$ a power that would annul the entire chromatism of all the lenses. To obtain these various results, it is first necessary that the values of the indices of refraction of the elements $L_1$, $L_2$, $L_3$, $L_4$, should be in a certain order relatively to one another. The glass of the front lens must have the highest index of refraction and the third, the second and the fourth lens must come afterward, in order of decreasing values.

$$n_1 \geqslant n_3 > n_2 > n_4$$

At the outside limit $n_1$ and $n_3$ may be equal. Moreover, in order to allow of correction of all the aberrations by means of the meniscus $L_4$, it is necessary that they should possess the following relationship:

$$\frac{\Delta n_3}{n_3-1} \leqslant \frac{\Delta n_1}{n_1-1} < \frac{\Delta n_4}{n_4-1} < \frac{\Delta n_2}{n_2-1}$$

By way of example, the following values may be indicated which give a perfectly corrected objective.

| | | | | | |
|---|---|---|---|---|---|
| $Ra_1$= 30 | $Rp_1$=601 | $e_1$=5.5 | $n_1$=1.6233 | $l_1$= 3.1 | |
| $Ra_2$= 61 | $Rp_2$= 28 | $e_2$=2.2 | $n_2$=1.5742 | $l_2$= 2.9 | |
| $Ra_3$=180 | $Rp_3$= 33 | $e_3$=5 | $n_3$=1.5889 | E= 9.4 | |
| $Ra_4$= 45.1 | $Rp_4$= 80.1 | $e_4$=2.7 | $n_4$=1.5518 | F=100 | |

$Ra$ being the front radius, $Rp$ being the back radius, $n$ being the index of refraction, $e$ being the thickness of the lenses, 1 being the thickness of the films of air, E being the spacing apart of the two systems, F being the focal distance, $\Delta n$ being the variation of $n$ between the lines for which the achromatism is effected.

An objective possessing the above values has an opening equal to $$\frac{F}{3.5}$$

with a corrected field of 43°, that is to say that in order to cover a plate 9 cm.x12cm., it is necessary to give it a focal distance equal to 205 mm.

The objective is particularly suitable for taking instantaneous exposures, or with very little light, for color photography, etc. It is also applicable for projections as its use avoids any deterioration of the plates or films such as is frequently caused by the calorific radiation accompanying a light of too great intensity.

The numerical values indicated above are only given by way of example, and may be varied within wide limits, provided the general conditions set forth are observed.

What I claim is:

1. An objective of large relative opening, corrected from chromatic, spherical, field curvature and astigmatic aberrations, comprising substantially four lenses, the three first lenses forming a system of large opening the aberrations of which are positive, the fourth lens being a meniscus correcting said aberrations.

2. An objective comprising four lenses, the indices of refraction of the glasses of the first, third, second and fourth lens, having successively decreasing values, the indices of the first and third lens being at the upper and lower limits respectively equal to one another, while the dispersive power decreases from the third to the first lens, then to the fourth, then to the second, these quotients being at the upper and lower limits respectively equal for the third and the first lens.

3. An objective of large relative opening, corrected from chromatic, spherical, field curvature and astigmatic aberrations, comprising substantially four lenses, the three first lenses forming a system of large opening the aberrations of which are positive, the fourth lens being a meniscus correcting said aberrations, the meniscus being separated from the preceding lens by a concave-convex film of air of suitable thickness and at least equal to $\frac{2}{3}$ of the axial thickness of the meniscus.

The foregoing specification of my objective signed by me this tenth day of May, 1913.

CHARLES HENRI FLORIAN.

Witnesses:
 HANSON C. COXE,
 RENÉ THIRIOT.

Copies of this patent may be obtained for five cents each, by addressing the "Commissioner of Patents, Washington, D. C."